US010945307B2

(12) United States Patent
Wang et al.

(10) Patent No.: US 10,945,307 B2
(45) Date of Patent: Mar. 9, 2021

(54) IMPLEMENTATION OF WIRELESS RELAYING

(71) Applicant: NEW H3C TECHNOLOGIES CO., LTD., Hangzhou (CN)

(72) Inventors: Zhuxun Wang, Beijing (CN); Jian Deng, Beijing (CN); Youhua Cai, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 211 days.

(21) Appl. No.: 16/171,368

(22) Filed: Oct. 26, 2018

(65) Prior Publication Data

US 2019/0069340 A1 Feb. 28, 2019

Related U.S. Application Data

(63) Continuation of application No. PCT/CN2017/085835, filed on May 25, 2017.

(30) Foreign Application Priority Data

May 26, 2016 (CN) .......................... 201610362677.9

(51) Int. Cl.
*H04W 88/04* (2009.01)
*H04L 29/06* (2006.01)
(Continued)

(52) U.S. Cl.
CPC ......... *H04W 88/04* (2013.01); *H04L 63/0428* (2013.01); *H04L 63/083* (2013.01);
(Continued)

(58) Field of Classification Search
CPC ...................................................... H04W 88/04
See application file for complete search history.

(56) References Cited

U.S. PATENT DOCUMENTS 5,898,690 A * 4/1999 Masashi ................ H04W 88/02
370/401
6,421,714 B1 * 7/2002 Rai .................... H04W 12/0013
709/217

(Continued)

FOREIGN PATENT DOCUMENTS

| CN | 103053202 A | 4/2013 |
|---|---|---|
| CN | 103634860 A | 3/2014 |
| CN | 103906263 A | 7/2014 |
| CN | 105409319 A | 3/2016 |

*Primary Examiner* — Ponnoreay Pich
(74) *Attorney, Agent, or Firm* — Perkins Coie LLP; Jordan Becker

(57) ABSTRACT

The present disclosure provides a method for implementation of wireless relaying. The method is applied to a wireless relay device. The method comprises: a wireless relay device sends a probe request packet carrying a first detection code and device information of the wireless relay device; receive a probe response packet sent by a first wireless routing device, the probe response packet carrying an SSID and a password corresponding to the first wireless routing device; and send an authentication request packet to a second wireless routing device, the authentication request packet carrying the SSID and the password that is carried in the probe response packet sent by the second wireless routing device to the wireless relay device, and the second wireless routing device being one of the first wireless routing devices.

15 Claims, 6 Drawing Sheets

(51) Int. Cl.
      *H04W 12/06*       (2021.01)
      *H04W 12/02*       (2009.01)
      *H04W 40/00*       (2009.01)
      *H04W 40/22*       (2009.01)
      *H04W 40/24*       (2009.01)
      *H04B 17/318*       (2015.01)
      *H04W 8/00*       (2009.01)

(52) U.S. Cl.
    CPC ......... *H04L 63/0853* (2013.01); *H04W 12/02* (2013.01); *H04W 12/06* (2013.01); *H04B 17/318* (2015.01); *H04W 8/005* (2013.01); *H04W 40/00* (2013.01); *H04W 40/22* (2013.01); *H04W 40/246* (2013.01)

(56) References Cited

U.S. PATENT DOCUMENTS

| | | | |
|---|---|---|---|
| 2007/0211659 A1* | 9/2007 | Li | H04L 63/08 370/329 |
| 2010/0172285 A1* | 7/2010 | Tokuyasu | H04B 7/155 370/315 |
| 2010/0197221 A1* | 8/2010 | Nishio | H04B 7/15542 455/7 |
| 2010/0214930 A1* | 8/2010 | Hu | H04W 40/22 370/241 |
| 2011/0255449 A1* | 10/2011 | Rappaport | H04B 7/15521 370/277 |
| 2013/0310108 A1 | 11/2013 | Altman | |
| 2017/0332307 A1* | 11/2017 | Pan | H04W 12/08 |
| 2019/0069340 A1* | 2/2019 | Wang | H04L 63/083 |

* cited by examiner

IMPLEMENTATION OF WIRELESS RELAYING

CROSS-REFERENCE TO RELATED APPLICATIONS

This patent application is a continuation of PCT/CN2017/085835 filed May 25, 2017, which claims priority to Chinese Patent Application No. 201610362677.9, filed with the Chinese Patent Office on May 26, 2016, entitled "Method and Apparatus for Implementation of Wireless Relaying", which is incorporated herein by reference in its entirety.

BACKGROUND ART

WLAN (Wireless Local Area Network) technology is one of the hot topics in the current communications field. Compared with a wired network, the wireless LAN is relatively simple to activate and implement, with a low maintenance cost. In a WLAN, wireless coverage can be provided by a wireless routing device. However, in actual application scenarios, there may be wireless coverage blind spots in some areas of a house due to the presence of obstacles such as walls.

In order to solve the abovementioned problem, a wireless relay device may be added between the wireless routing device and the area of wireless coverage blind spot. By relaying a wireless signal of the wireless routing device by the wireless relay device, the wireless coverage area provided by the wireless routing device can be expanded to achieve the purpose of eliminating the wireless coverage blind spots.

DETAILED DESCRIPTION OF EMBODIMENTS

A wireless routing device may send a Beacon packet to a wireless relay device at a predetermined beacon time interval, wherein the Beacon packet may carry therein an SSID (Service Set Identifier), etc. After the wireless relay device monitors the Beacon packet, the wireless relay device may add the SSID carried in the Beacon packet to a wireless channel list. Thus, the wireless relay device may add the SSIDs carried in the multiple monitored Beacon packets to the wireless channel list.

The wireless relay device may select an SSID from the wireless channel list, and send based on the SSID a Probe Request packet to the corresponding wireless routing device. After the wireless routing device receives the Probe Request packet, the wireless routing device may send a Probe Response packet to the wireless relay device so as to complete a probing process. After an authentication process and an association process are completed, the wireless relay device establishes a connection with the wireless routing device to implement relaying of a wireless signal of the wireless routing device.

Figure 1:
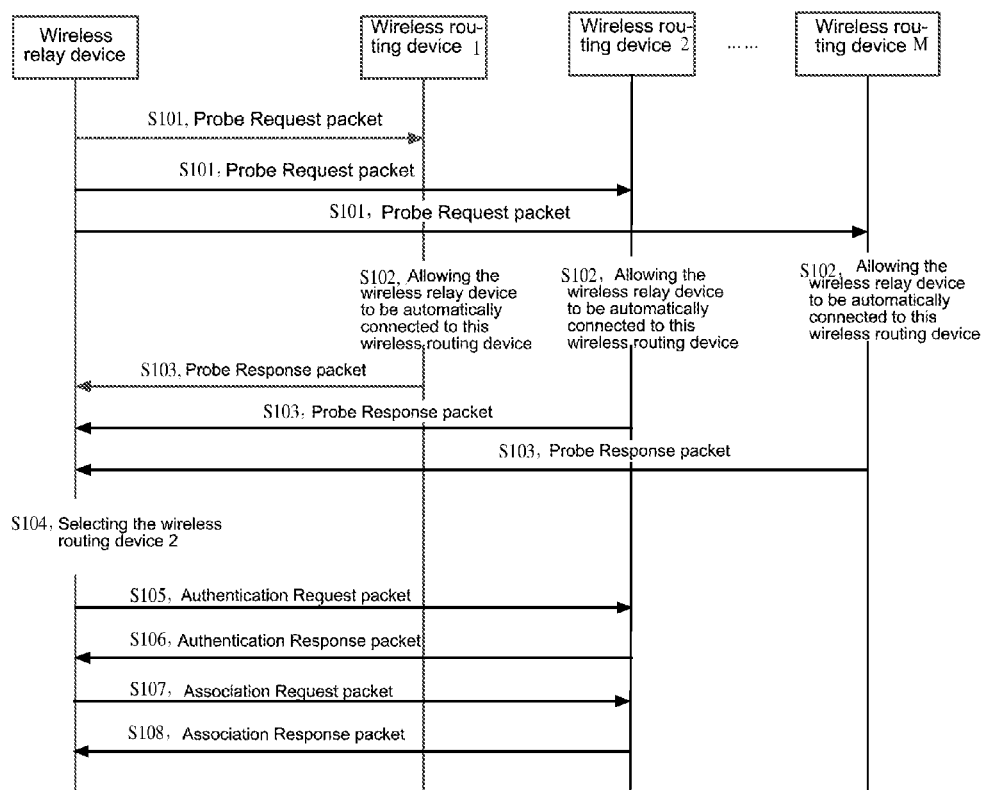
FIG. 1 is an interactive flowchart of a method for implementation of wireless relaying, shown in an example of the present disclosure.

FIG. 1 is an interactive flowchart of a method for implementation of wireless relaying shown in an example of the present disclosure. As shown in FIG. 1, in the example of the present disclosure, the method for implementation of wireless relaying may comprise the following steps S101 to S108.

In step S101, a wireless relay device may send a Probe Request packet, wherein the Probe Request packet carries a first detection code and device information of the wireless relay device.

After the wireless relay device is powered on and activated, if it is judged that the current configuration is a default configuration, the probe request packet may be sent within an ISM (Industrial Scientific Medical) frequency band supported by this device at a predetermined sending time interval T1. Here, the ISM band may be at 2.4 GHz (Gigahertz) and 5 GHz.

In the actual implementation process, if the Probe Request packets are sent too frequently, more resources may be occupied. If the Probe Request packet is sent too infrequently, it may take too long to complete the wireless relay process. Therefore, the abovementioned sending time interval T1 may be set to 60 seconds.

Here, multiple detection codes may be saved in the wireless relay device. The detection code may be a character string consisting of multiple bytes. Before the wireless relay device sends the Probe Request packet, a detection code may be selected as a first detection code. For example, "H3C_MAGIC" may be selected as the detection code. The wireless relay device may send a Probe Request packet carrying the selected detection code, for example the first detection code, and device information of the wireless relay device.

In one of the embodiments, each detection code may have a corresponding encryption algorithm. For example, the encryption algorithm corresponding to the detection code "H3C_MAGIC" may be an AES (Advanced Encryption Standard) encryption algorithm, and the encryption algorithm corresponding to the detection code "H3C" may be a DES (Data Encryption Standard) encryption algorithm. The wireless relay device may encrypt the device information of the wireless relay device by using an encryption algorithm, for example an AES encryption algorithm, corresponding to a selected detection code, for example "H3C_MAGIC", to obtain the device information in ciphertext. The wireless relay device may send a Probe Request packet carrying the selected detection code, for example the first detection code, and the device information in ciphertext. However, the device information of the wireless relay device may also not be encrypted, for example, when the first detection code does not have a corresponding encryption algorithm.

The abovementioned device information may be one or a combination of more than one of information such as a MAC (Media Access Control) address, an electronic tag, a device model, and so on.

In step S102, after receiving the Probe Request packet, the wireless routing device may judge, based on the first detection code and the device information of the wireless relay device which are carried in the Probe Request packet, whether the wireless relay device is allowed to be automatically connected to this wireless routing device, and send a Probe Response packet to the wireless relay device when it is determined that it is allowed.

As shown in FIG. 1, there may be multiple wireless routing devices, for example, a wireless routing device 1, a wireless routing device 2, . . . , a wireless routing device M, with M being an integer greater than 1, that receive the Probe Request packet sent out by the wireless relay device, therefore each of the wireless routing devices may execute the abovementioned step S102.

Figure 2:
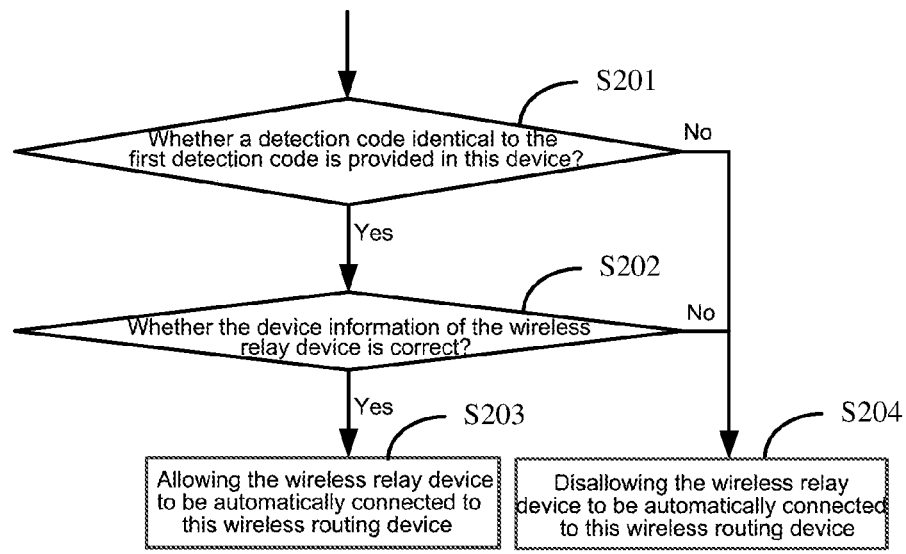
FIG. 2 is a flowchart of a method of judging, by a wireless routing device, whether a wireless relay device is allowed to be automatically connected to this wireless routing device, shown in an example of the present disclosure.

In step S102, a method of judging, based on the first detection code and the device information of the wireless relay device, by the wireless routing device, whether the wireless relay device is allowed to be automatically connected to this wireless routing device may be as shown in FIG. 2, and may include the following steps S201 to S204.

In step S201, it is judged whether a detection code identical to the first detection code is provided in this wireless routing device. If yes, step S202 is executed. If not, step S204 is executed.

Here, multiple detection codes may also be saved on the wireless routing device, and these detection codes may be identical to the detection codes saved on the wireless relay device.

In step S202, this wireless routing device judges whether the device information of the wireless relay device is correct. If yes, step S203 is executed, otherwise step S204 is executed.

When the device information of the wireless relay device is encrypted by an encryption algorithm corresponding to the first detection code, the wireless routing device may search for the encryption algorithm corresponding to the first detection code and decrypt the device information of the wireless relay device in ciphertext that is carried in the Probe Request packet by using a decryption algorithm corresponding to the found encryption algorithm so as to obtain the device information of the wireless relay device in plaintext, in order to acquire the device information of the wireless relay device from the Probe Request packet. When the device information of the wireless relay device is not encrypted by the encryption algorithm corresponding to the first detection code, the wireless routing device may directly acquire the device information of the wireless relay device in plaintext from the Probe Request packet. After that, the wireless routing device may judge whether the information of the wireless relay device in plaintext is correct. In this way, it can serve the function of security authentication.

The judgment of whether the information of the wireless relay device is correct by the wireless routing device may be carried out by using one or a combination of more than one of the following methods.

Method 1: When device information of the wireless relay device is a MAC address, the wireless routing device may compare the MAC address with a MAC address carried in a Source MAC field of a MAC Header. If the two addresses are the same, it is determined that the device information of the wireless relay device is correct.

Method 2: When device information of the wireless relay device is one or a combination of more than one of information such as a MAC address, an electronic tag, a device model, and so on, the wireless routing device may send the device information of the wireless relay device to a cloud server in order to query the correctness of the device information. After the wireless routing device receives an authentication result returned by the cloud server, it can be known whether the device information is correct.

In the actual implementation process, other judgment methods may also be used. For example, when the device information of the wireless relay device is an electronic tag, the wireless relay device may add to the Probe Request packet a field for carrying an electronic tag, so that the wireless routing device can compare the electronic tag carried in the field with the electronic tag in the device information. Alternatively, when the device information of the wireless relay device is a device model, the wireless relay device may add to the Probe Request packet a field for carrying a device model, so that the wireless routing device can compare the device model carried in the field with the device model in the device information, which is not limited in the embodiments of the present disclosure.

In step S203, the wireless routing device allows the wireless relay device to be automatically connected to this wireless routing device.

In step S204, the wireless routing device does not allow the wireless relay device to be automatically connected to this wireless routing device.

Figure 3:
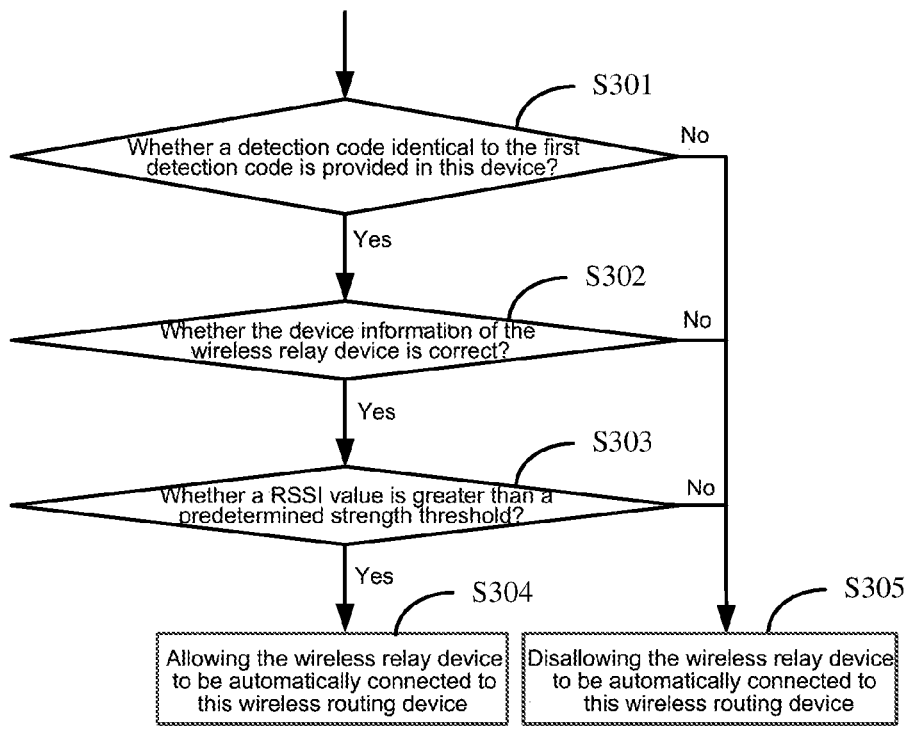
FIG. 3 is a flowchart of a method of judging, by a wireless routing device, whether a wireless relay device is allowed to be automatically connected to this wireless routing device, shown in another example of the present disclosure.

The wireless routing device may judge, based on the first detection code and the device information of the wireless relay device, whether the wireless relay device is allowed to be automatically connected to this wireless routing device. The Probe Request packet may further carry a RSSI (Received Signal Strength Indication) value. The wireless routing device may also judge, based on the RSSI value carried in the Probe Request packet, whether the wireless relay device is allowed to be automatically connected to this wireless routing device, and the judgment method may include the following steps S301 to S305 as shown in FIG. 3.

In step S301, the wireless routing device judges whether a detection code identical to the first detection code carried in the Probe Request packet is provided in this device. If yes, step S302 is executed. If not, step S305 is executed.

In step S302, the wireless routing device judges whether the device information of the wireless relay device carried in the Probe Request packet is correct. If yes, step S303 is executed, otherwise step S305 is executed.

In step S303, the wireless routing device judges whether the RSSI value carried in the Probe Request packet is greater than a predetermined strength threshold. If yes, step S304 is executed, otherwise step S305 is executed.

In an example, a Packet Information field of the Probe Request packet may carry a RSSI value.

In step S304, the wireless routing device allows the wireless relay device to be automatically connected to this wireless routing device.

In step S305, the wireless routing device does not allow the wireless relay device to be automatically connected to this wireless routing device.

In the method shown in FIG. 3, the purpose of the adding judgment of the RSSI value when the wireless routing device is judging whether the wireless relay device is allowed to be automatically connected to this wireless routing device, is to avoid incorrect relaying of wireless signals of other wireless routing devices by the wireless relay device in an environment where there are multiple wireless routing devices. The abovementioned predetermined strength threshold may be set to −65 dBm, and the corresponding unobstructed straight-line distance is about 2 meters. For example, if the wireless routing device judges that the RSSI value carried in the Probe Request packet is greater than −65 dBm, the wireless relay device may be allowed to be automatically connected to this wireless routing device, indicating that the wireless routing device allows only a wireless relay device at a physical distance within about 2 meters therefrom to be automatically connected to this wireless routing device.

Further, when the wireless routing device is judging whether the wireless relay device is allowed to be automatically connected to this wireless routing device, the purpose of the adding judgment of the RSSI value may further include the following purpose: even if the encryption algorithm is cracked, if the wireless relay device cannot approach the wireless routing device at a physical distance, the wireless relay device still cannot be automatically connected to the wireless routing device.

Supposing that each of the wireless routing device 1, the wireless routing device 2, and the wireless routing device M in FIG. 1 allows the wireless relay device to be automatically connected thereto, these wireless routing devices may each send a Probe Response packet to the wireless relay device. Here, the Probe Response packet may carry a second detection code, an SSID, password, and wireless parameter corresponding to the wireless routing device, etc. Here, the wireless parameter may include: one or a combination of more than one of parameters such as a RSSI value, a channel frequency bandwidth mode, a wireless channel, a signal quality (CINR (Carrier to Interference plus Noise Ratio)/SINR (Signal to Interference plus Noise Ratio)), a timing offset, a frequency offset, an angle of incidence of a terminal signal, a wireless relay mode, a physical rate, and so on. The wireless parameter may also include other parameters, which are not limited in the embodiments of the present disclosure.

Here, the channel frequency bandwidth mode may be HT (High Throughput) 20, HT40, HT80, HT160, or the like.

The wireless relay mode may be single frequency or dual frequency. When the wireless routing device supports dual frequency and the wireless relay device also supports dual frequency, the wireless routing device may specify the wireless relay mode of the wireless relay device. For example, the wireless routing device may specify that the wireless relay device should relay a wireless signal of the wireless routing device with a dual frequency mode, and may further specify a first frequency band used for data transmission between the wireless relay device and the wireless routing device, and a second frequency band used for data transmission between the wireless relay device and a wireless client. For example, the first frequency band may be 2.4 GHz, and the second frequency band may be 5 GHz, or the first frequency band may be 5 GHz, and the second frequency band may be 2.4 GHz. In an example, the wireless relay device may perform wireless relay using the first frequency band and perform wireless coverage using the second frequency band.

The wireless routing device selects a detection code as the second detection code before sending the Probe Response packet. For example, the wireless routing device may select "H3C_MAGIC" as the second detection code, and encrypt the SSID, password, and wireless parameter by using the AES encryption algorithm corresponding to the selected detection code "H3C_MAGIC" to obtain the SSID, password, and wireless parameter in ciphertext. The wireless routing device may send a Probe Response packet carrying the selected detection code (i.e., the second detection code) and the SSID, password, and wireless parameter in ciphertext. The second detection code in the Probe Response packet may be identical to or different from the first detection code in the Probe Request packet. If the second detection code does not have a corresponding encryption algorithm, the SSID, password, and wireless parameter may also not be encrypted.

In step S103, the wireless relay device receives a Probe Response packet sent by the wireless routing device.

After receiving any Probe Response packet, the wireless relay device may judge whether a detection code identical to the second detection code carried in the Probe Response packet is provided in this device. If yes, the SSID, password, and wireless parameter may be acquired from the Probe Response packet. For example, when the SSID, password, and wireless parameter are encrypted by an encryption algorithm corresponding to the second detection code, the wireless relay device may search for the encryption algorithm corresponding to the second detection code, and decrypt the SSID, password and wireless parameter in ciphertext which are carried in the Probe Response packet by using a decryption algorithm corresponding to the found encryption algorithm, so as to obtain the SSID, password, and wireless parameter in plaintext.

In step S104, if the wireless relay device receives the Probe Response packets sent by two or more wireless routing devices within a predetermined waiting time T2, the wireless relay device may select one of the wireless routing devices.

When the predetermined waiting time T2 is up, at this moment the wireless relay device may acquire multiple SSIDs, passwords, and wireless parameters at this time. In this case, the wireless relay device may select an SSID and a password corresponding to the wireless parameter that meets a preset condition, which may be referred to as a first SSID and a first password for convenience of description. The wireless relay device may select a wireless routing device that sends out a Probe Response packet carrying the first SSID and the first password.

Since the wireless parameter may include one or a combination of more than one of parameters such as a RSSI value, a channel frequency bandwidth mode, a wireless channel, a signal quality (CINR/SINR), a timing offset, a frequency offset, an angle of incidence of a terminal signal, a wireless relay mode, a physical rate, and so on, the abovementioned preset condition may be set in connection with one or a combination of more than one of the abovementioned parameters. For example, when the wireless parameter is a RSSI value, the preset condition may be set such that the RSSI value is greater than a predetermined strength threshold, which is not limited in the embodiments of the present disclosure.

In addition, in the actual implementation process, if the predetermined waiting time T2 is too short, the wireless relay device may be unable to be connected to an ideal wireless routing device. If the predetermined waiting time T2 is too long, it may take too long to complete the wireless relay process. Therefore, preferably, the waiting time T2 may be set to 60 seconds.

It is assumed that, in step S104, the wireless relay device selects the wireless routing device 2 in FIG. 1.

In step S105, the wireless relay device sends an Authentication Request packet to the selected wireless routing device (wireless routing device 2). Here, the Authentication Request packet may carry the first SSID and the first password carried in the Probe Response packet sent by the selected wireless routing device.

In step 106, after receiving the Authentication Request packet the selected wireless routing device authenticates based on the first SSID and the first password, the wireless relay device, and sends an Authentication Response packet to the wireless relay device after the authentication is passed.

In step S107, after receiving the Authentication Response packet, the wireless relay device sends an Association Request packet to the selected wireless routing device.

In step S108, after receiving the Association Request packet, the selected wireless routing device sends an Association Response packet to the wireless relay device.

Upon receipt of the Association Response packet, the wireless relay device establishes a connection with the selected wireless routing device, and can relay a wireless signal of the selected wireless routing device.

In addition, after the wireless relay device receives the Association Response packet, it is also possible to set this device to a client mode, perform wireless setting in accordance with a wireless parameter that meets the abovementioned preset condition, and save the wireless parameter in a configuration file of a non-default configuration. At this time, the current configuration of the wireless relay device may be updated to a non-default configuration. In this way, when the wireless relay device is powered on and activated again, since a pointer for indicating the activation location points to a memory space in which the configuration file is saved, the wireless setting can be directly performed in accordance with the configuration file, thereby implementing the relaying of a wireless signal of the selected wireless routing device.

In the method for implementation of wireless relaying shown in FIG. 1, when the wireless relay device receives a Probe Response packet responded by only one wireless routing device, the wireless relay device may not perform the selection operation of step S104, but directly performs the authentication and association processes of steps S105 to S108 with the wireless routing device.

In the abovementioned method, after the success of relaying, the wireless relay device may send out an indication signal for indicating the success of relaying. For example, the wireless relay device may send out an indication signal by an LED (Light Emitting Diode) indicator light, or send out an indication signal by sound or the like, which is not limited in the embodiments of the present disclosure.

In the abovementioned method of the embodiment of the present disclosure, the wireless relay device may send a Probe Request packet carrying a first detection code and device information of the wireless relay device to a first wireless routing device. After receiving the Probe Request packet, the first wireless routing device will judge, based on the first detection code and the device information, whether the wireless relay device is allowed to be automatically connected to this wireless routing device. The first wireless routing device sends a Probe Response packet carrying an SSID and a password corresponding to the first wireless routing device to the wireless relay device when it is determined that the automatic connection is allowed. The wireless relay device may receive Probe Response packets sent by multiple first wireless routing devices, and send, to a second wireless routing device, an Authentication Request packet carrying an SSID and a password corresponding to the second wireless routing device, so that the relaying of a wireless signal of the second wireless routing device can be implemented. It can be understood that the second wireless routing device is one of the first wireless routing devices. In the abovementioned process, the wireless relay device and the wireless routing device can automatically discover and negotiate with each other, so as to implement a simple and fast method for implementation of wireless relaying, thereby achieving the purpose of simplifying configuration and optimizing the network.

In an example, the wireless relay device may wait for a predetermined time after the Probe Request packet is sent, and select based on the Probe Response packets received within the predetermined time, when the predetermined time is up, one of the first wireless routing devices which send the Probe Response packets, with the selected one as the second wireless routing device. Here, the Probe Response packet further carries a second detection code and a wireless parameter; and a detection code identical to the second detection code carried in the Probe Response packet sent by the second wireless routing device is provided in the wireless relay device.

In another example, when the predetermined time is up, the wireless relay device selects from the received Probe Response packets a first Probe Response packet carrying a wireless parameter that meets a preset condition; and the wireless relay device selects a wireless routing device that sends out the first probe response packet as the second wireless routing device.

In an example, the step of selecting from the received probe response packets a first probe response packet carrying a wireless parameter that meets a preset condition may include: searching for, by the wireless relay device, an encryption algorithm corresponding to the second detection code carried in the received probe response packet; decrypting, by the wireless relay device, the SSID, password, and wireless parameter in ciphertext which are carried in the received probe response packet by using a decryption algorithm corresponding to the found encryption algorithm to obtain the SSID, password, and wireless parameter in plaintext; and selecting, by the wireless relay device, a probe response packet carrying a wireless parameter that meets a preset condition as the first probe response packet.

Corresponding to the foregoing embodiments of the method for implementation of wireless relaying, the present disclosure further provides embodiments of a first wireless relay implementing apparatus applicable to a wireless relay device and a second wireless relay implementing apparatus applicable to a wireless routing device.

Figure 4:
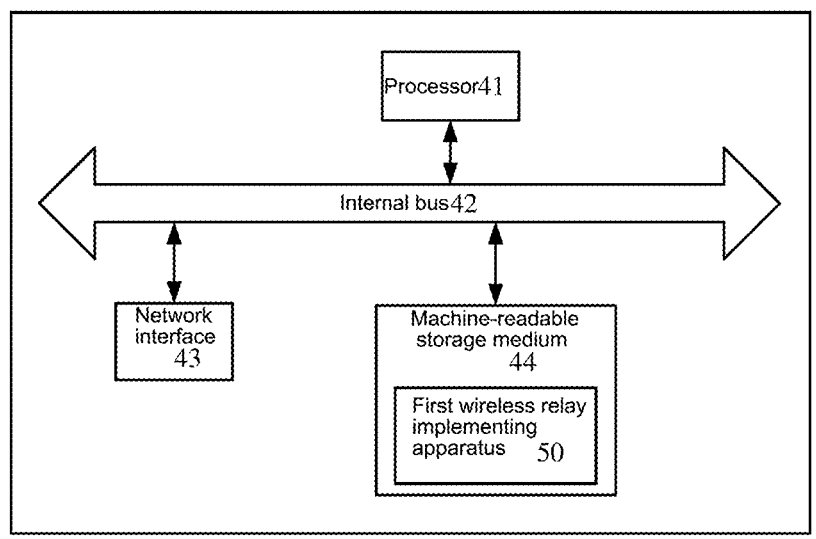
FIG. 4 is a schematic diagram of a hardware structure of a wireless relay device shown in an example of the present disclosure.

The embodiment of the first wireless relay implementing apparatus of the present disclosure may be applied to a wireless relay device. The first wireless relay implementing apparatus may be implemented by software, or may also be implemented by means of hardware or a combination of hardware and software. Taking the implementation by software as an example, the first wireless relay implementing apparatus, as an apparatus in the sense of logic, may be understood as a machine-readable instruction stored in a machine-readable storage medium. From a hardware level, as shown in FIG. 4 which is a hardware structural diagram of a wireless relay device of the present disclosure, in addition to a processor 41, an internal bus 42, a network interface 43, and a machine-readable storage medium 44 shown in FIG. 4, the wireless relay device may further comprise other hardware to implement other functions such as a general wireless relay function, which is not described in any more detail.

In different embodiments, the machine-readable storage medium 44 may be: a RAM (Radom Access Memory), a volatile memory, a non-volatile memory, a flash memory, a storage drive (such as a hard disk drive), a solid state hard disk, any type of storage disk (such as an optical disk, DVD, or the like), or a similar storage medium, or a combination thereof.

Figure 5:
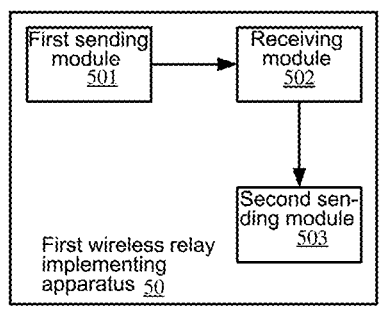
FIG. 5 is a schematic structural diagram of a first wireless relay implementing apparatus applied to a wireless relay device, shown in an example of the present disclosure.

Further, a machine-readable instruction corresponding to a first wireless relay implementing apparatus 50 and executed by the processor 41 may be stored on the machine-readable storage medium 44. Referring to FIG. 5, FIG. 5 is a schematic structural diagram of a first wireless relay implementing apparatus applied to a wireless relay device, shown in an example of the present disclosure. When divided functionally, the first wireless relay implementing apparatus 50 may comprise the following modules: a first sending module 501, a receiving module 502, and a second sending module 503.

The first sending module 501 may be configured to send a Probe Request packet. Here, the Probe Request packet carries a first detection code and device information of the wireless relay device.

The receiving module 502 may be configured to receive a Probe Response packet sent by a first wireless routing device. Here, the Probe Response packet carries an SSID and a password corresponding to the first wireless routing device.

The second sending module 503 may be configured to send an Authentication Request packet to a second wireless routing device. Here, the Authentication Request packet carries the SSID and the password carried in the Probe Response packet sent by the second wireless routing device to the wireless relay device, and the second wireless routing device is one of the first wireless routing devices.

Figure 6:
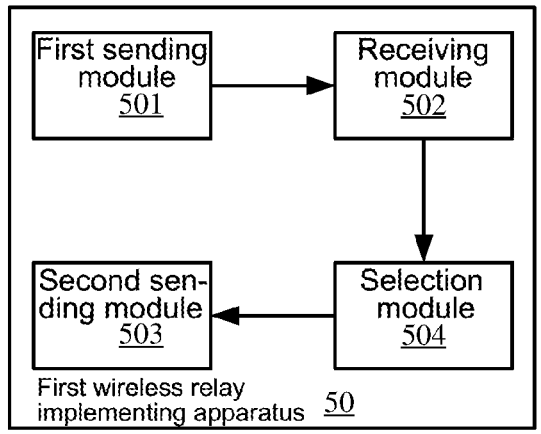
FIG. 6 is a schematic structural diagram of a first wireless relay implementing apparatus applied to a wireless relay device, shown in another example of the present disclosure.

As shown in FIG. 6, the abovementioned first wireless relay implementing apparatus 50 may further comprise a selection module 504. The selection module 504 may be configured to select a first wireless routing device as the second wireless routing device, if the receiving module 502 receives the Probe Response packets sent by two or more first wireless routing devices within a predetermined waiting time. In this way, the second sending module 503 may be configured to send an Authentication Request packet to the second wireless routing device. Here, the Authentication Request packet carries a first SSID and a first password which are carried in the Probe Response packet sent by the second wireless routing device to the wireless relay device.

Figure 7:
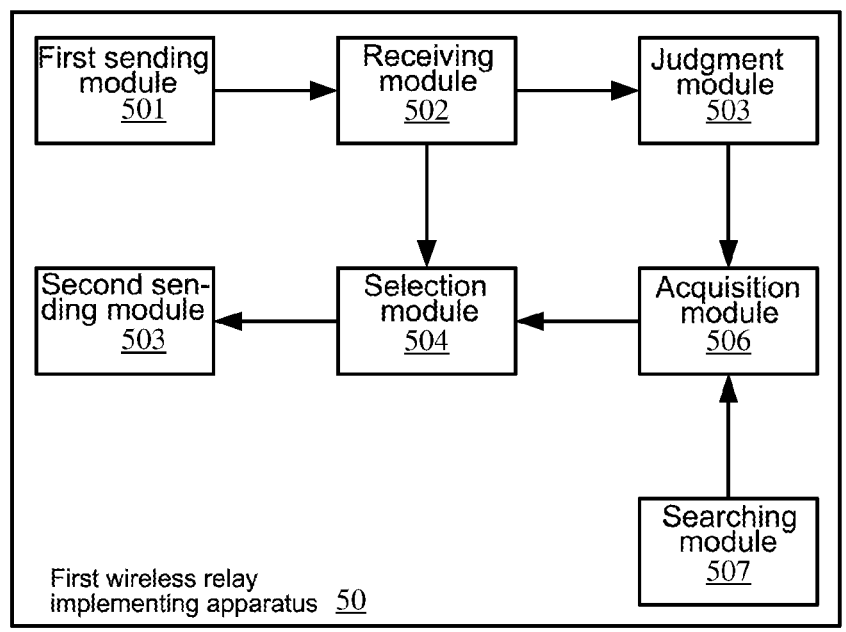
FIG. 7 is a schematic structural diagram of a first wireless relay implementing apparatus applied to a wireless relay device, shown in a yet another example of the present disclosure.

Here, the Probe Response packet may further carry a second detection code and a wireless parameter. In this way, as shown in FIG. 7, the abovementioned first wireless relay implementing apparatus 50 may further comprise a judgment module 505 and an acquisition module 506. The judgment module 505 may be configured to judge whether a detection code identical to the second detection code carried in the Probe Response packet is provided in the wireless relay device, after the receiving module 502 receives the Probe Response packet sent by the first wireless routing device. The acquisition module 506 may be configured to acquire the SSID, the password, and the wireless parameter from the Probe Response packet if a result of judgment by the judgment module 505 is yes.

According to an example, the selection module 504 may be configured to select from the received Probe Response packets, when the predetermined waiting time is up, a first Probe Response packet carrying a wireless parameter that meets a preset condition, and to select a first wireless routing device that sends out the first Probe Response packet as the second wireless routing device.

As shown in FIG. 7, the abovementioned first wireless relay implementing apparatus 50 may further comprise a searching module 507. The searching module 507 may be configured to search for an encryption algorithm corresponding to the second detection code carried in the received Probe Response packet. In this way, the acquisition module 506 may be configured to decrypt the SSID, password, and wireless parameter in ciphertext which are carried in the received Probe Response packet by using a decryption algorithm corresponding to the encryption algorithm found by the searching module 507 to obtain the SSID, password, and wireless parameter in plaintext.

Figure 8:
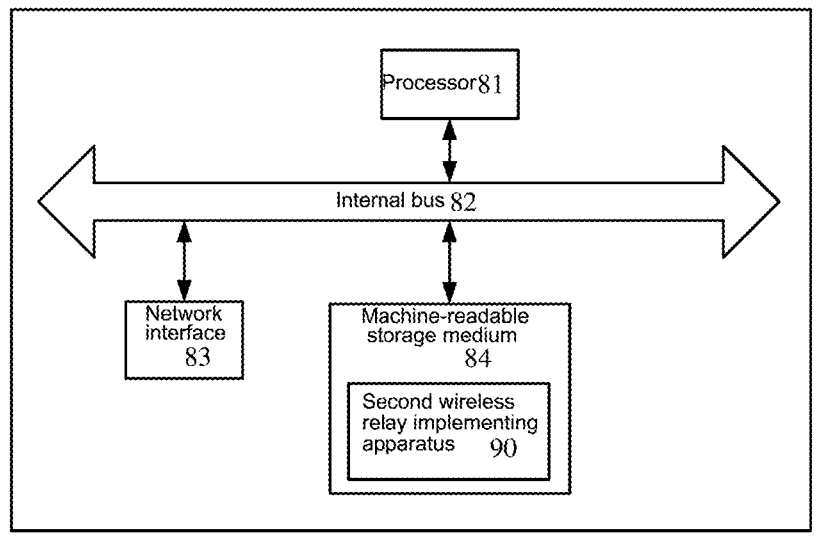
FIG. 8 is a schematic diagram of a hardware structure of a wireless routing device shown in an example of the present disclosure.

The embodiment of the second wireless relay implementing apparatus of the present disclosure may be applied to a wireless routing device. The second wireless relay implementing apparatus may be implemented by software, or may also be implemented by means of hardware or a combination of hardware and software. Taking the implementation by software as an example, the second wireless relay implementing apparatus, as an apparatus in the sense of logic, may be understood as a machine-readable instruction stored in a machine-readable storage medium. From a hardware level, as shown in FIG. 8 which is a hardware structural diagram of a wireless routing device of the present disclosure, in addition to a processor 81, an internal bus 82, a network interface 83, and a machine-readable storage medium 84 shown in FIG. 8, the wireless routing device may comprise other hardware to implement other functions such as a general wireless routing function, which is not described in any more detail.

In different embodiments, the machine-readable storage medium 84 may be: a RAM (Radom Access Memory), a volatile memory, a non-volatile memory, a flash memory, a storage drive (such as a hard disk drive), a solid state hard disk, any type of storage disk (such as an optical disk, DVD, or the like), or a similar storage medium, or a combination thereof.

Figure 9:
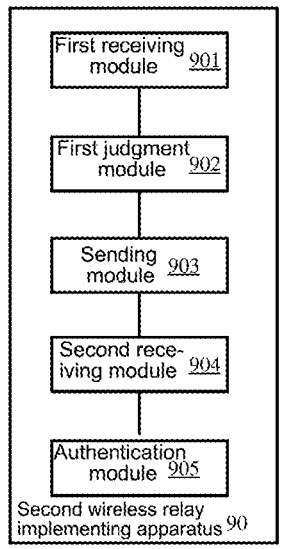
FIG. 9 is a schematic structural diagram of a second wireless relay implementing apparatus applied to a wireless routing device, shown in an example of the present disclosure.

Further, a machine-readable instruction corresponding to a second wireless relay implementing apparatus 90 and executed by the processor 81 may be stored on the machine-readable storage medium 84. Referring to FIG. 9, FIG. 9 is a schematic structural diagram of a second wireless relay implementing apparatus applied to a wireless routing device, shown in an example of the present disclosure. When divided functionally, the second wireless relay implementing apparatus 90 may comprise the following modules: a first receiving module 901, a first judgment module 902, a sending module 903, a second receiving module 904, and an authentication module 905.

The first receiving module 901 may be configured to receive a Probe Request packet sent by a wireless relay device and carrying a first detection code and device information of the wireless relay device.

The first judgment module 902 may be configured to judge, based on the first detection code and the device information, whether the wireless relay device is allowed to be automatically connected to this wireless routing device after the first receiving module 901 receives the Probe Request packet.

The sending module 903 may be configured to send a Probe Response packet to the wireless relay device if the first judgment module 902 allows the wireless relay device to be automatically connected to this wireless routing device. Here, the Probe Response packet carries an SSID and a password corresponding to this wireless routing device.

The second receiving module 904 may be configured to receive an Authentication Request packet sent by the wireless relay device. Here, the authentication request packet carries the SSID and the password carried in the Probe Response packet sent by the wireless routing device to the wireless relay device.

The authentication module 905 may be configured to authenticate based on the SSID and the password carried in the Authentication Request packet the wireless relay device after the second receiving module 904 receives the Authentication Request packet sent by the wireless relay device.

Figure 10:
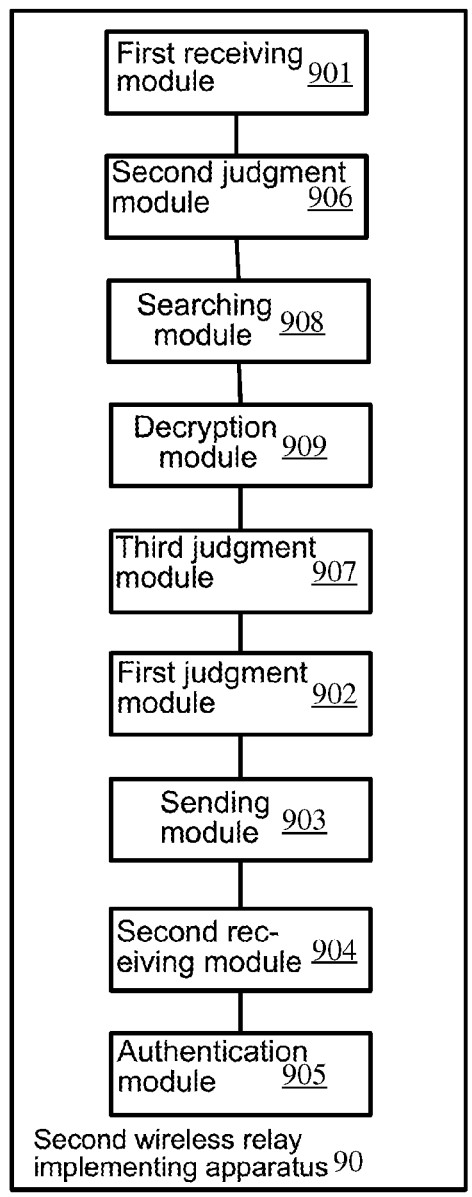
FIG. 10 is another schematic structural diagram of a second wireless relay implementing apparatus applied to a wireless routing device, shown in another example of the present disclosure.

As shown in FIG. 10, the abovementioned second wireless relay implementing apparatus 90 may further comprise: a second judgment module 906 and a third judgment module 907. Here, the second judgment module 906 may be configured to judge whether a detection code identical to the first detection code carried in the Probe Request packet is provided in this wireless routing device. The third judgment module 907 may be configured to judge whether the device information of the wireless relay device carried in the Probe Request packet is correct if a result of judgment by the second judgment module 906 is yes.

In this way, the first judgment module 902 may be configured to allow the wireless relay device to be automatically connected to this wireless routing device if a result of judgment by the third judgment module 907 is yes. Alternatively, the first judgment module 902 may also be configured to judge whether a RSSI value carried in the Probe Request packet is greater than a predetermined strength threshold, if the result of judgment by the third judgment module 907 is yes, and to allow the wireless relay device to be automatically connected to this wireless routing device if yes.

In addition, as shown in FIG. 10, the abovementioned second wireless relay implementing apparatus 90 may further comprise: a searching module 908 and a decryption module 909. Here, the searching module 908 may be configured to search for an encryption algorithm corresponding to the first detection code after the first receiving module 901 receives the Probe Request packet sent by the wireless relay device and carrying the first detection code and the device information of the wireless relay device. The decryption module 909 may be configured to decrypt the device information of the wireless relay device in ciphertext carried in the Probe Request packet by using a decryption algorithm corresponding to the encryption algorithm found by the searching module 908, to obtain the device information of the wireless relay device in plaintext.

Reference may be made to the processes of implementation of the corresponding steps in the abovementioned methods for details of the processes of implementation of the functions and effects of the respective modules in the abovementioned apparatuses, which are not described in any more detail here.

Since the embodiments of the apparatuses are substantially corresponding to the embodiments of the methods, reference may be made to the partial description of the embodiments of the methods for related description thereof. The embodiments of the apparatuses described above are merely illustrative, wherein the units described as separate components may or may not be physically separated, and the components illustrated as the units may or may not be physical units, that is, they may be located at one place, or may also be distributed onto multiple network units. Some or all of the modules may be selected according to actual requirements to achieve the objects of technical solutions of the present embodiment. It can be understood and practiced by those of ordinary skill in the art without any inventive effort.

It should be noted that, in this text, relational terms such as first and second and the like may be used solely to distinguish one entity or operation from another entity or operation without necessarily requiring or implying any actual such relation or order between such entities or operations. The terms "comprises," "comprising," or any other variation thereof are intended to cover a nonexclusive inclusion, such that a process, method, article, or apparatus that comprises a list of elements does not include only those elements but may include other elements not expressly listed or inherent to such process, method, article, or apparatus. An element defined by "comprises a . . . " does not, without more constraints, preclude the existence of additional identical elements in the process, method, article, or apparatus that comprise the element.

The methods and apparatuses provided in the embodiments of the present disclosure have been described in detail above, the principles and embodiments of the present disclosure have been set forth herein using specific examples, and the description of the above embodiments is only for helping to understand the methods of the present disclosure and the core concept thereof. Moreover, it will be appreciated by those of ordinary skill in the art that changes may be made to the specific embodiments and the scope of application based on the concept of the present disclosure. As described above, the description of the present specification should not be construed as limiting the present disclosure.

What is claimed is:

1. A method for implementation of wireless relaying, comprising:
    a wireless relay device sending a probe request packet, wherein the probe request packet carries a first detection code and device information of the wireless relay device;
    the wireless relay device receiving a first probe response packet sent by a first wireless routing device of a plurality of wireless routing devices, wherein the first probe response packet carries a service set identifier SSID and a password corresponding to the first wireless routing device; and
    the wireless relay device sending an authentication request packet to a second wireless routing device, wherein the authentication request packet carries an SSID and a password carried in a second probe response packet sent by the second wireless routing device to the wireless relay device, and the second wireless routing device is one of the plurality of wireless routing devices.

2. The method according to claim 1, further comprising:
    the wireless relay device waiting for a predetermined time since the probe request packet is sent; and
    the wireless relay device selecting, based on one or more probe response packets received within the predetermined time, when the predetermined time is up, one of the plurality of wireless routing devices that sent the one or more probe response packets, wherein the selected one as-of the plurality of wireless routing devices is the second wireless routing device, wherein the second probe response packet further carries a second detection code and a wireless parameter; and a detection code identical to the second detection code carried in the second probe response packet is provided in the wireless relay device.

3. The method according to claim 2, wherein the step of selecting comprises:

the wireless relay device selecting, from the one or more probe response packets received within the predetermined time, a probe response packet carrying a wireless parameter that meets a preset condition, when the predetermined time is up; and the wireless relay device selecting a wireless routing device that sent out the probe response packet carrying the wireless parameter that meets the preset condition, as the second wireless routing device.

4. The method according to claim 3, wherein the step of selecting from the one or more probe response packets received within the predetermined time, a probe response packet carrying a wireless parameter that meets a preset condition comprises:

the wireless relay device searching for an encryption algorithm corresponding to the second detection code carried in the second probe response packet;

the wireless relay device decrypting the SSID, password, and wireless parameter in ciphertext which are carried in the second probe response packet by using a decryption algorithm corresponding to the found encryption algorithm, to obtain the SSID, password, and wireless parameter in plaintext; and the wireless relay device selecting the probe response packet carrying the wireless parameter that meets the preset condition as the second probe response packet.

5. A method for implementation of wireless relaying, comprising:

a wireless routing device receiving a probe request packet sent by a wireless relay device and carrying a first detection code and device information of the wireless relay device;

the wireless routing device judging, based on the first detection code and the device information, whether the wireless relay device is allowed to be automatically connected to the wireless routing device;

the wireless routing device sending a probe response packet to the wireless relay device if the wireless routing device determines that the wireless relay device is allowed to be automatically connected to the wireless routing device, wherein the probe response packet carries a service set identifier SSID and a password corresponding to the wireless routing device;

the wireless routing device receiving an authentication request packet sent by the wireless relay device; and the wireless routing device authenticating based on the SSID and the password carried in the authentication request packet, the wireless relay device.

6. The method according to claim 5, wherein the step of judging based on the first detection code and the device information whether the wireless relay device is allowed to be automatically connected to the wireless routing device comprises:

the wireless routing device judging whether a detection code identical to the first detection code carried in the probe request packet is provided in the wireless routing device, wherein if the detection code is provided, it is judged whether the device information of the wireless relay device is correct, wherein if the device information of the wireless relay device is judged to be correct, it is determined that the wireless relay device is allowed to be automatically connected to the wireless routing device.

7. The method according to claim 6, wherein the step of determining whether the wireless relay device is allowed to be automatically connected to the wireless routing device comprises:

the wireless routing device judging whether a received signal strength indication RSSI value carried in the probe request packet is greater than a predetermined strength threshold; and determining that the wireless relay device is allowed to be automatically connected to the wireless routing device if it is judged that the received signal strength indication RSSI value carried in the probe request packet is greater than the predetermined strength threshold.

8. The method according to claim 5, wherein after the step of receiving a probe request packet sent by a wireless relay device and carrying a first detection code and device information of the wireless relay device, the method further comprises:

the wireless routing device searching for an encryption algorithm corresponding to the first detection code; and the wireless routing device decrypting the device information of the wireless relay device in ciphertext carried in the probe request packet by using a decryption algorithm corresponding to the found encryption algorithm, to obtain the device information of the wireless relay device in plaintext.

9. A wireless relay device, comprising:

a first processor, and a first machine-readable storage medium storing a first at least one machine-readable instruction, wherein the first processor is configured to read and execute the first at least one machine-readable instruction, to:

send a probe request packet, wherein the probe request packet carries a first detection code and device information of the wireless relay device;

receive a first probe response packet sent by a first wireless routing device of a plurality of wireless routing devices, wherein the first probe response packet carries a service set identifier SSID and a password corresponding to the first wireless routing device; and send an authentication request packet to a second wireless routing device, wherein the authentication request packet carries an SSID and a password carried in a second probe response packet sent by the second wireless routing device to the wireless relay device, and the second wireless routing device is one of the plurality of wireless routing devices.

10. The wireless relay device according to claim 9, wherein the first at least one machine-readable instruction causes the first processor to:

wait for a predetermined time after the probe request packet is sent; and select based on one or more probe response packets received within the predetermined time, when the predetermined time is up, one of the plurality of wireless routing devices that sent the one or more probe response packets, wherein the selected one of the plurality of wireless routing devices is the second wireless routing device, wherein the second probe response packet further carries a second detection code and a wireless parameter; and
a detection code identical to the second detection code carried in the second probe response packet sent by the second wireless routing device is provided in the wireless relay device.

11. The wireless relay device according to claim 10, wherein during the step of selecting, the first at least one machine-readable instruction causes the first processor to:
select, when the predetermined time is up, from the one or more probe response packets received within the predetermined time, a probe response packet carrying a wireless parameter that meets a preset condition; and
select a first wireless routing device that sent out the probe response packet carrying the wireless parameter that meets the preset condition, as the second wireless routing device.

12. The wireless relay device according to claim 11, wherein during the step of selecting from the one or more probe response packets received within the predetermined time, a probe response packet carrying a wireless parameter that meets a preset condition, the first at least one machine-readable instruction causes the first processor to:
search for an encryption algorithm corresponding to the second detection code carried in the second probe response packet;
decrypt the SSID, password, and wireless parameter in ciphertext which are carried in the second probe response packet by using a decryption algorithm corresponding to the found encryption algorithm, to obtain the SSID, password, and wireless parameter in plaintext; and
select the probe response packet carrying the wireless parameter that meets the preset condition as the second probe response packet.

13. The wireless relay device according to claim 9, wherein the wireless relay device cooperates with the second wireless routing device to implement relaying, and the second wireless routing device comprises:

a second processor, and
a second machine-readable storage medium storing a second at least one machine-readable instruction,
wherein the second processor executes the method for implementation of wireless relaying according to claim 5 by reading the second at least one machine executable instruction.

14. The wireless relay device according to claim 13, wherein during the step of judging based on the first detection code and the device information whether the wireless relay device is allowed to be automatically connected to the second wireless routing device, the second at least one machine-readable instruction causes the second processor of the second wireless routing device to:
judge whether a detection code identical to the first detection code carried in the probe request packet is provided in the second wireless routing device,
wherein if the detection code is provided, it is judged whether the device information of the wireless relay device is correct,
wherein if the device information of the wireless relay device is correct, it is determined that the wireless relay device is allowed to be automatically connected to the second wireless routing device.

15. The wireless relay device according to claim 14, wherein during determining whether the wireless relay device is allowed to be automatically connected to the second wireless routing device, the second at least one machine-readable instruction further causes the second processor to:
judge whether a received signal strength indication RSSI value carried in the probe request packet is greater than a predetermined strength threshold, wherein it is determined that the wireless relay device is allowed to be automatically connected to the second wireless routing device if the received signal strength indication RSSI value carried in the probe request packet is greater than the predetermined strength threshold.

* * * * *